US011813759B2

(12) United States Patent
Gao et al.

(10) Patent No.: US 11,813,759 B2
(45) Date of Patent: Nov. 14, 2023

(54) INTELLIGENT MICROMANIPULATION SYSTEM BASED ON MACHINE VISION

(71) Applicant: Harbin Institute of Technology, Heilongjiang (CN)

(72) Inventors: Huijun Gao, Heilongjiang (CN); Mingsi Tong, Heilongjiang (CN); Gefei Zhang, Heilongjiang (CN); Gang Huang, Heilongjiang (CN); Songlin Zhuang, Heilongjiang (CN); Weiyang Lin, Heilongjiang (CN); Xinghu Yu, Heilongjiang (CN)

(73) Assignee: HARBIN INSTITUTE OF TECHNOLOGY, Heilongjiang (CN)

( * ) Notice: Subject to any disclaimer, the term of this patent is extended or adjusted under 35 U.S.C. 154(b) by 776 days.

(21) Appl. No.: 16/929,449

(22) Filed: Jul. 15, 2020

(65) Prior Publication Data
US 2021/0276196 A1  Sep. 9, 2021

(30) Foreign Application Priority Data

Mar. 9, 2020 (CN) .......................... 202010156073.5

(51) Int. Cl.
*B25J 9/16* (2006.01)
*B25J 7/00* (2006.01)
(Continued)

(52) U.S. Cl.
CPC .............. *B25J 9/1697* (2013.01); *B25J 7/00* (2013.01); *B25J 9/0096* (2013.01); *G02B 21/32* (2013.01); *G05B 2219/40193* (2013.01)

(58) Field of Classification Search
CPC ........ G06T 7/00; G06T 7/0016; B25J 9/1697; B25J 7/00; B25J 9/0096; B25J 19/023;
(Continued)

(56) References Cited

U.S. PATENT DOCUMENTS 10,245,734 B2 * 4/2019 Tanaka ................... B25J 9/1682
11,372,225 B2 * 6/2022 Peng ....................... C12M 21/06

OTHER PUBLICATIONS

Nguyen et al., "Automated Micromanipulation for a Microhand with All-In-Focus Imaging System". (Year: 2011).*

* cited by examiner

*Primary Examiner* — Phuoc Tran
(74) *Attorney, Agent, or Firm* — Crowell & Moring LLP; John C. Freeman

(57) ABSTRACT

Disclosed is an intelligent micromanipulation system based on machine vision, including a base, wherein a microscope, a rotating table and two lifting tables are arranged on the base, the microscope is located right above the rotating table, the two lifting tables are arranged at two sides of the rotating table, respectively, and each is provided with a mechanical arm, each of the two manipulators is provided with an end effector, the mechanical arm is capable of driving the corresponding end effector to perform fine adjustment in x, y and z directions, one of the end effectors clamps a suction holding needle in communication with a suction pump, while the other end effector clamps an injection needle in communication with an injection pump; and the rotating table includes a tray, a rotating mechanism and a driving device, and the driving device drives the tray to rotate via the rotating mechanism.

20 Claims, 8 Drawing Sheets

(51) Int. Cl.
*B25J 9/00* (2006.01)
*G02B 21/32* (2006.01)

(58) Field of Classification Search
CPC ............... B25J 19/04; G02B 21/32; G05B 2219/40193; G05B 2219/45121; G05B 2219/45182
See application file for complete search history.

INTELLIGENT MICROMANIPULATION SYSTEM BASED ON MACHINE VISION

CROSS REFERENCE TO RELATED APPLICATION

This application claims the priority of Chinese Patent Application No. 202010156073.5 entitled "Intelligent Micromanipulation System Based on Machine Vision" filed with China National Intellectual Property Administration on Mar. 9, 2020, which is incorporated herein by reference in its entirety.

TECHNICAL FIELD

The present invention relates to the technical field of micromanipulation equipment, in particular to an intelligent micromanipulation system based on machine vision.

BACKGROUND ART

Micromanipulation technique refers to an operation means for carrying out specific experiments on controlled objects, such as organisms, materials, chemical molecules and the like, with visual or force feedbacks by using actuators of micro/nano kinematic accuracy. Conventional micromanipulation such as intracytoplasmic sperm injection, nuclear transfer, etc., are all performed manually and typically requires experienced experimenters who have been trained for half a year or more, to implement. Common equipment is configured to comprise a microscope, a micro-motion manipulator and an object table, and the experimenter sits in front of the microscope to observe what happens in the work space with eyes and operates the micro-motion manipulator to conduct an experiment according to his/her own experience. It can be seen that this process consumes much time and labor, and largely relies on personal experience of the operator, so that it is difficult to ensure the consistency of all operation processes, so the obtained results have a low level of confidence in high-throughput statistics in life sciences.

In order to solve the above problems, many research institutions have studied and developed many micromanipulation systems. However, an existing micromanipulation system is mainly formed by combination of a microscope, an object table and a microoperation manipulator, is mostly operated in a semi-automatic manner involving manual work, and lacks an automatic control method with closed-loop feedback.

An automatic micromanipulation system requires to be able to establish an accurate relationship between an image coordinate system and a micro-manipulator coordinate system. However, when an image is captured by a camera of a stereomicroscope, there is a certain line-of-sight inclination angle due to misalignment of the optical path of an ocular lens and the optical path of an objective lens. For some microorganisms as observed objects which need to be immersed in water (for example, embryos, zebrafish larvae, nematodes and the like), operations, such as placing, suction holding, etc., in a continuous operation process may lead to slight changes of the height of water surface, and as the stereomicroscope has the characteristic of oblique line of sight, such changes of the water surface cannot be ignored. Moreover, every time the height of water surface changes, a focal plane is caused to also be changed, so that it needs to realize automatic focusing of the microscope.

SUMMARY OF THE INVENTION

One aspect of the present invention provides an intelligent micromanipulation system based on machine vision in order to solve the problems in the prior art and achieve accurate micromanipulation on micro experiment objects commonly used in biological research.

In order to achieve the above object, the invention adopts the following scheme: provided is an intelligent micromanipulation system based on machine vision, including a base, wherein a microscope, a rotating table and two lifting tables which are manually adjustable are arranged on the base, the microscope is located right above the rotating table, the two lifting tables are arranged at two sides of the rotating table, respectively, and each lifting table is provided with a mechanical arm, each of the two mechanical arms is provided with an end effector, the mechanical arm is capable of driving the corresponding end effector to perform fine adjustment in x, y and z directions, one of the end effectors clamps a suction holding needle which is in communication with a suction pump, while the other clamping holder clamps an injection needle which is in communication with an injection pump; and the rotating table includes a tray, a rotating mechanism and a driving device, and the driving device is capable of driving the tray to rotate via the rotating mechanism. In an embodiment, the rotating table further includes a rotating support platform, and the driving device is a step motor and is mounted on a fixed seat fixedly arranged below the rotating support platform.

In an embodiment, the rotating mechanism comprises a tray sleeve, a first belt wheel, a synchronous belt and a second belt wheel, the first belt wheel is fixedly disposed on an output shaft of the driving device, the synchronous belt is wound on the first belt wheel and the second belt wheel, the second belt wheel is fixedly connected to the tray sleeve, the rotating support platform is slidably arranged on the base through a rail fixing device, and the rotating tray is mounted on the tray sleeve; and the rail fixing device includes two sliding rails arranged on the base, and the two sliding rails are arranged at two sides of the rotating support platform, respectively, and the two sliding rails are respectively slidingly engaged with ends of the rotating support platform.

In an embodiment, the bearing is axially positioned in the rotating support platform through a bearing cover of the bearing, an outer ring of the bearing is in contact with the rotating support platform, an inner ring of the bearing is in contact with the tray sleeve, and the bearing is a deep groove ball bearing.

In an embodiment, the intelligent micromanipulation system based on machine vision further includes a camera which is mounted above the microscope and right opposite to an ocular lens of the microscope, wherein the camera is in signal connection with a host computer.

In an embodiment, the intelligent micromanipulation system based on machine vision further includes an LED light source which is mounted below the base and the LED light source is arranged right below the rotating table.

In an embodiment, the LED light source is covered with a brightness enhancement film.

In an embodiment, the base is also provided with a needle tip positioning plate.

In an embodiment, a needle tip of the injection needle can realize automatic positioning and can be adaptively adjusted according to a change of a height of a liquid surface so as to ensure accuracy of automatic operation.

In an embodiment, the microscope can realize automatic focusing on an observation operation object according to information of a captured image.

In an embodiment, the position height of the microscope is continuously adjusted based on an extremum searching algorithm to achieve automatic focusing.

The present invention further provides a needle tip positioning method based on a pinhole model, which is applicable to the intelligent micromanipulation system based on machine vision described above, including the following steps of: firstly, acquiring the position coordinates of an end of the mechanical arm, then, obtaining pixel position coordinates of the end of the mechanical arm based on a product of the position coordinates of the end of the mechanical arm and a preset coordinate transformation matrix, thereafter, calculating a bias between the pixel position coordinates of the end of the mechanical arm and the pixel coordinates of an image captured by a camera, and finally, through a series of calculations obtaining intrinsic parameters of the transformation matrix between the position coordinates of the end of the mechanical arms and the pixel coordinates of the image captured by the camera, as well as intrinsic parameters of an imaging system; and when a next operation is performed, calculating a change in the height of a liquid surface according to a change of pixel coordinates of ends of the mechanical arms relative to pixel coordinates at the same position for a last operation, and then updating the coordinate transformation matrix.

In an embodiment, a difference between the pixel position coordinates of the mechanical arms and the pixel coordinates of the image is taken as a loss function, and intrinsic parameters of the transformation matrix between the pixel position coordinates of the mechanical arms and the pixel coordinates of the image as well as intrinsic parameters of the imaging system are calculated by using a gradient descent method.

In an embodiment, a relationship between the position coordinates of the mechanical arms and the pixel coordinates of the image is as follows:

$$\begin{bmatrix} u \\ v \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} x_m \\ y_m \\ z_m \\ 1 \end{bmatrix}$$

wherein, u, v are coordinates in an image pixel coordinate system; $x_m$, $y_m$, $z_m$ are coordinates in a mechanical arms coordinate system; and $\{m_{ij}\}$ are parameters of the coordinate transformation matrix.

Compared with the prior art, the embodiments of the invention achieve the following technical effects:

The intelligent micromanipulation system provided by the present invention can be conveniently used to perform micromanipulation on irregular-shaped objects with convenience. With the micromanipulation system provided by the present invention, the attitude of a target object can be quickly adjusted, and the target object can be held by suction needle and injected by injection needle, so that manual operation may be eliminated, and the time for experiment may be reduced, thereby the manipulation efficiency of the target object may be improved; besides, by means of the injection pump, rapid high-throughput injection may be achieved. The micromanipulation system of the present invention is not only capable of rotating the target object into a predetermined attitude consistently, but also capable of providing a controllable suction pressure to minimize injuries caused by holding. The water surface projection and spatial height of the target object may be positioned at a micron level, so the target object may be accurately injected by the micromanipulation system.

BRIEF DESCRIPTION OF THE DRAWINGS

In order to more clearly illustrate the embodiments of the present invention or the prior art, the following is a brief introduction of the drawings to be used in the embodiments. It is obvious that the drawings in the following description are only some embodiments of the invention, and for those skilled in the art, other drawings can be obtained according to these drawings without involving any inventive effort.

Figure 1:
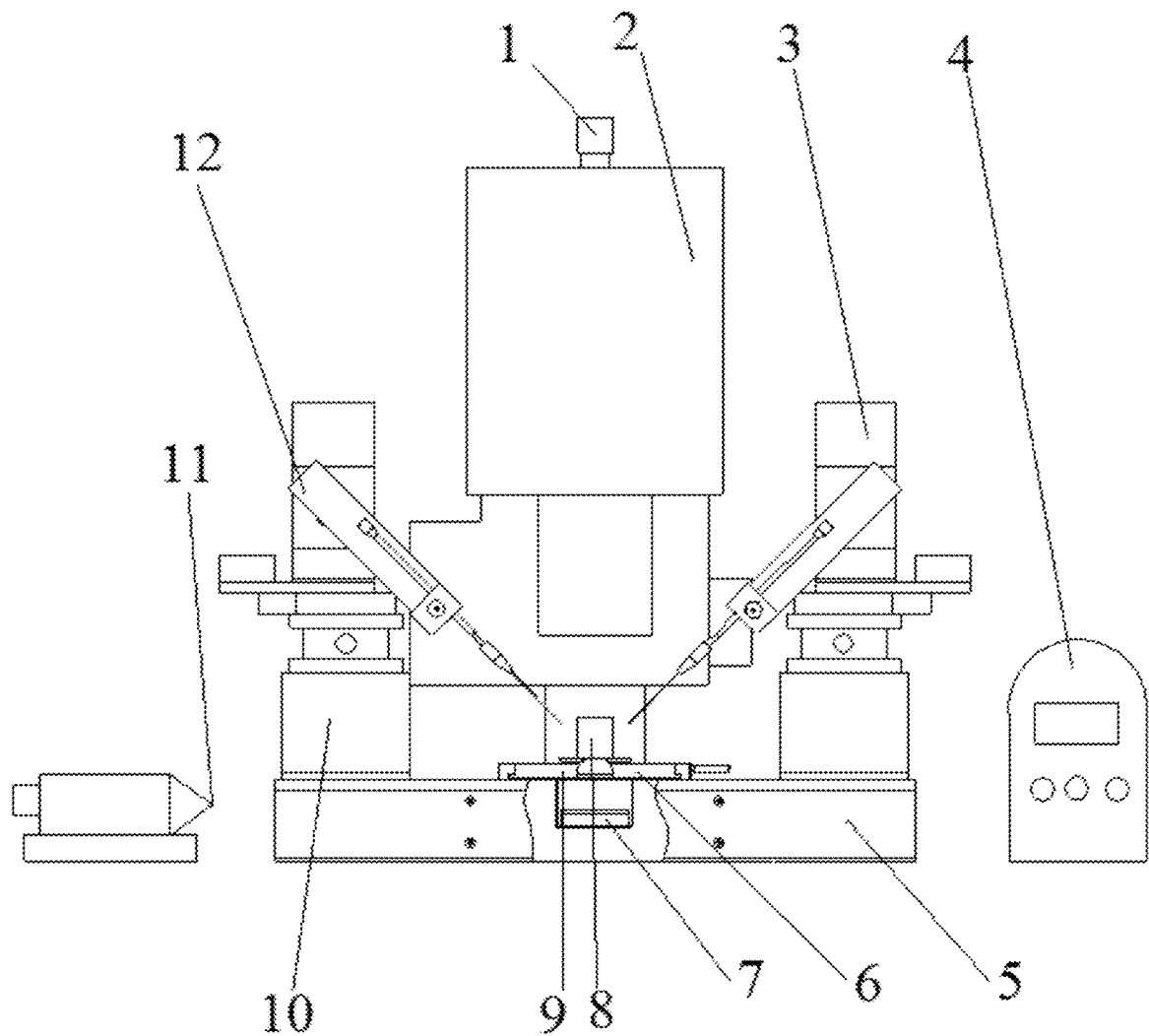
FIG. 1 is a schematic diagram showing the structure of an intelligent micromanipulation system based on machine vision according to the present invention.
Figure 2:
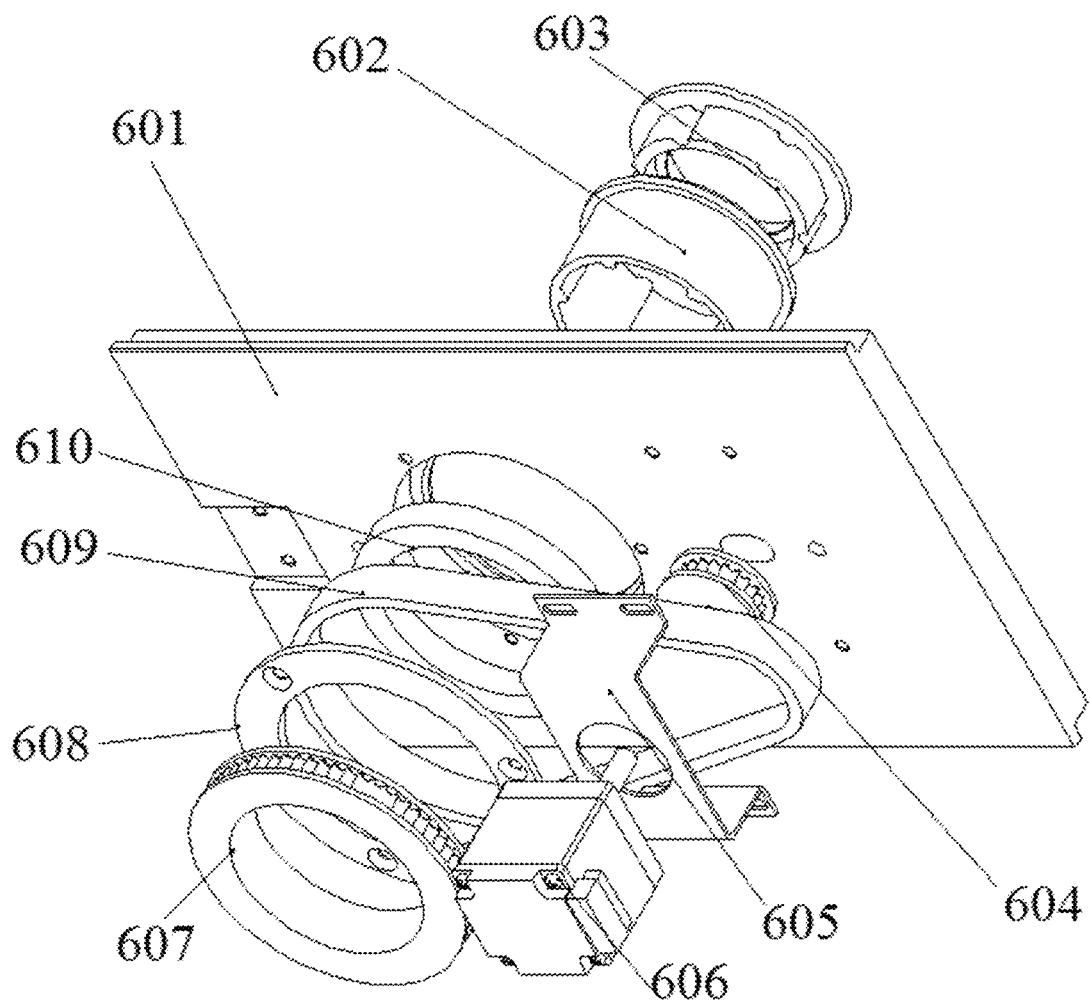
FIG. 2 is a schematic diagram showing the structure of a rotating table in the intelligent micromanipulation system based on machine vision according to the present invention.
Figure 3:
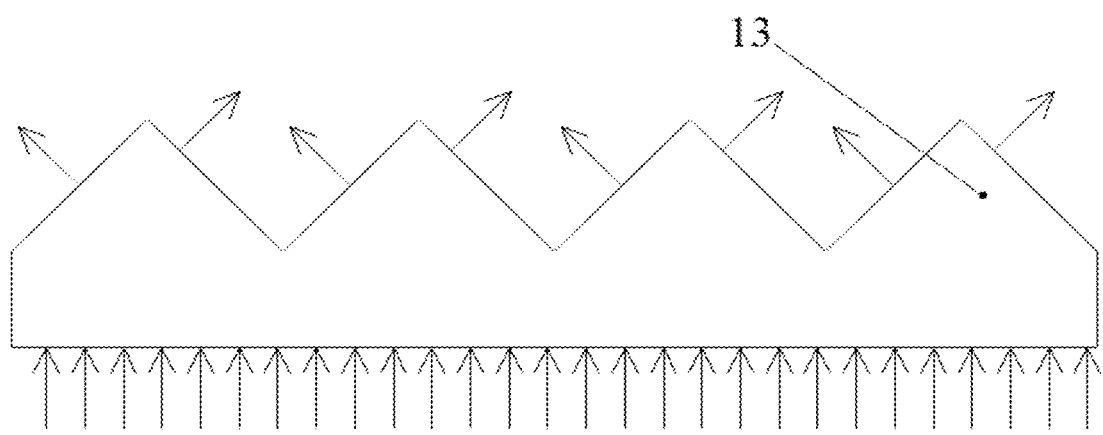
FIG. 3 is a schematic diagram showing the structure of a brightness enhancement film in the intelligent micromanipulation system based on machine vision according to the present invention.

in the figures: 1—camera, 2—microscope, 3—mechanical arm, 4—injection pump, 5—base, 6—rotating table, 601—rotating support platform, 602—tray sleeve, 603—rotating tray, 604—first belt wheel, 605—fixed seat, 606—step motor, 607—second belt wheel, 608—bearing cover, 609—synchronous belt, 610—bearing, 7—LED light source, 8—needle tip positioning plate, 9—rail fixing device, 10—lifting table, 11—suction pump, 12—end effector, 13—brightness enhancement film, 14—suction holding needle, 15—injection needle, and 16—organ to be injected.

DETAILED DESCRIPTION OF THE EMBODIMENTS

The technical solution in the embodiment of the present invention will be described clearly and fully hereinafter in combination with the drawings in the embodiment of the present invention. Obviously, the described embodiments are only part of, but not all of, embodiments of the present invention. Based on the embodiments of the present invention, all other embodiments obtained by those skilled in the art without involving any inventive effort are within the scope of the present invention.

An object of the present invention is to provide an intelligent micromanipulation system based on machine vision in order to solve the problems in the prior art and perform micromanipulation on irregular-shaped objects.

To further clarify the above objects, features and advantages of the present invention, a more particular description of the invention will be rendered by reference to the appended drawings and specific embodiments thereof.

As shown in FIGS. 1 to 5: this embodiment provides an intelligent micromanipulation system based on machine vision, including a base 5, wherein a microscope 2, a rotating table and two lifting tables 10 are arranged on the base 10. The model of the microscope 2 is Nikon-SMZ25. the microscope 2 is located right above the rotating table. The two lifting tables 10 are respectively arranged at two sides of the rotating table, and each lifting table is provided with a mechanical arm 3. The lifting tables 10 can be adjusted manually so as to adjust the height of the mechanical arms 3, and the model of the mechanical arm 3 is sutler MP-285. Two mechanical arms 3 are respectively provided with an end effector 12. The mechanical arms are capable of driving the corresponding end effector 12 to perform fine adjustment in x, y and z directions. One of the end effectors 12 clamps a suction holding needle 14 which is communicated with a suction pump 11, and the model of the suction pump 11 is CellTranm Air Eppendorf, while the other end effector 12 clamps an injection needle 15 which is in communication with an injection pump 4, and the model of the injection pump 4 is FemtoJet, Eppendorf.

The rotating table includes a rotating support platform 601, a tray, a rotating mechanism (also called transmission mechanism) and a driving device, and the driving device is capable of driving the tray to rotate via the transmission mechanism. The driving device is a step motor 606, and is mounted on a fixed seat 605 fixedly arranged below the rotating support platform 601. The transmission mechanism includes a tray sleeve 602, a first belt wheel 604, a synchronous belt 609, and a second belt wheel 607. The first belt wheel 604 is fixedly disposed on an output shaft of the driving device, the synchronous is wound on the first belt wheel 604 and the second belt wheel 607, the second belt wheel 607 is fixedly connected to the tray sleeve 602, the rotating support platform 601 is slidably arranged on the base 5 through a rail fixing device 9, and the rotating tray 603 is mounted on the tray sleeve 602. The rail fixing device 9 includes two sliding rails arranged on the base 5, and the two sliding rails are arranged at two sides of the rotating support platform 601, respectively, and each of the two sliding rails are respectively slidingly engaged with ends of the rotating support platform 601. The bearing 610 is axially positioned in the rotating support platform 601 through a bearing cover 608 of the bearing 610, an outer ring of the bearing 610 is in contact with the rotating support platform 601, an inner ring of the bearing 610 is in contact with the tray sleeve 602, and the bearing 610 is a deep groove ball bearing 610.

A camera 1 is mounted above the microscope 2 and right opposite to an ocular lens of the microscope 2, and the model of the camera 1 is GO-5000C-USB. An LED light source 7 is mounted below the base 5 and arranged right below the rotating table. In this embodiment, the LED light source 7 is covered with a brightness enhancement film 13, and the brightness enhancement film 13 is provided with triangular stripes on the surface (referring to FIG. 3). The brightness enhancement film 13 is used for changing vertical light into oblique light (referring to FIG. 3) so as to enhance the light at the rotating table and improve the uniformity of imaging brightness of the camera 1, thereby allowing the needle tip to be imaged more clearly. The camera 1, the lifting tables 10, the step motor 606, the LED light source 7, the injection pump 4, the suction pump 11 and the two mechanical arms 3 are respectively in signal connection with a host computer, which can control the starting, working and stopping of each of the above parts.

The base 5 is also provided with a needle tip positioning plate 8, which is used for assisting in determining mounting positions of the suction holding needle 14 and the injection needle 15 when they are mounted, so as to prevent needle tips from being mounted too low, which causes easy breaking of the needle tips, and to ensure the mounting height to be substantially identical for each time, providing convenience in use.

Taking a zebrafish larva as an operation object, a process of using the intelligent micromanipulation system based on machine vision of this embodiment is as follows.

Figure 4:
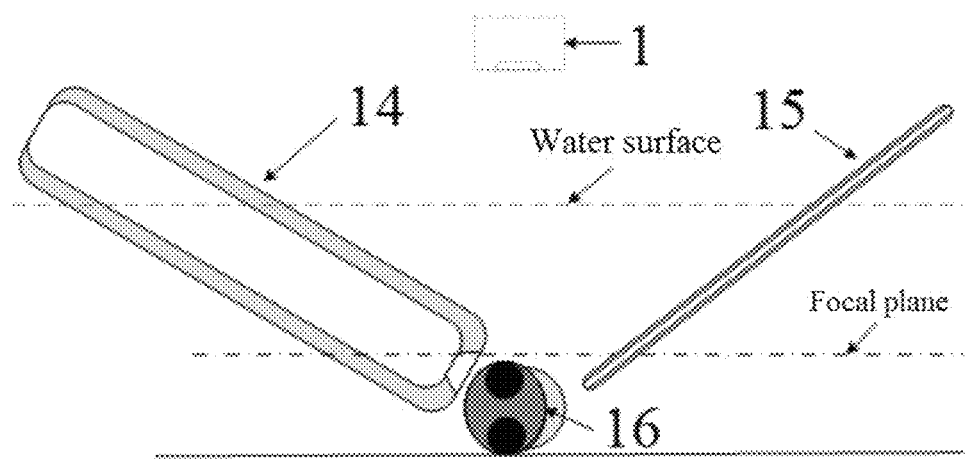
FIG. 4 is a schematic diagram illustrating organ injection of a zebrafish larva using the intelligent micromanipulation system based on machine vision according to the present invention.
Figure 5:
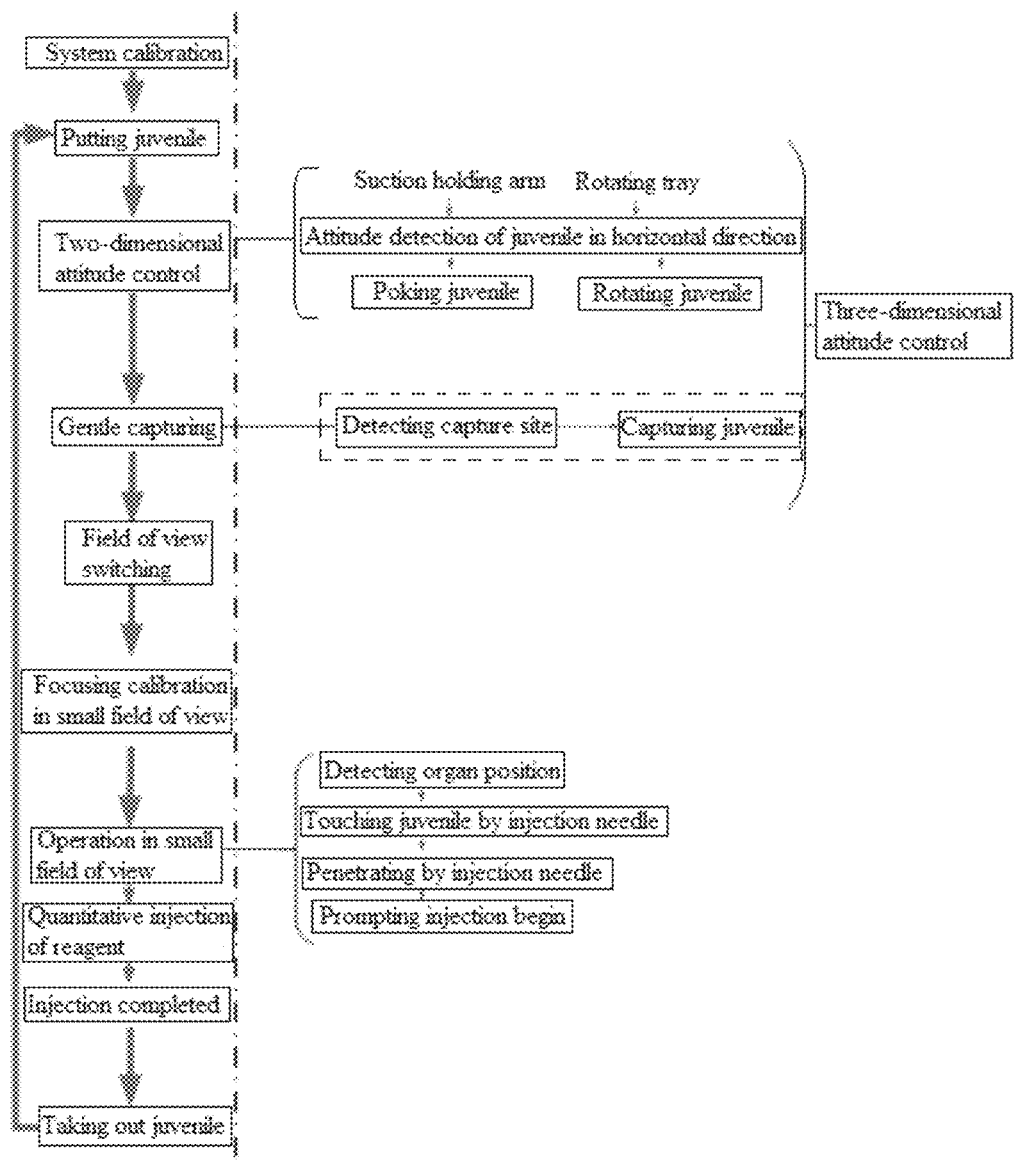
FIG. 5 is a flow chart illustrating organ injection of the zebrafish larva using the intelligent micromanipulation system based on machine vision according to the present invention.

After the device is mounted, the host computer, the camera 1 and the LED light source 7 are all turned on, and firstly, system calibration is performed, and the system calibration includes bottom contact detection of the suction holding needle 14, active focusing of the injection needle 15, hand-eye calibration of the injection needle 15 and the suction holding needle 14, and feature extraction of the rotating tray 603; the bottom contact detection of the suction holding needle 14 is performed in a manner that after startup, the suction holding needle 14 is controlled to vertically move downwards at a constant speed, when the suction holding needle 14 touches the bottom surface, the needle tip of the suction holding needle 14 is deformed, a horizontal displacement of the needle tip of the suction holding needle 14 can be seen through the microscope 2, and then the position of the suction holding needle 14 at this time is taken as a zero point of height; the hand-eye calibration of the injection needle 15 and the suction holding needle 14 is to obtain a relationship between the respective pixel displacement by which the needle tip of the injection needle 15 and the needle tip of the suction holding needle 14 move and the corresponding actual displacement; thereafter, the injection needle 15 and the suction holding needle 14 are positioned so as to be moved to the edges of the field of view of the camera and all parameters are set to values for start-up. After the zebrafish larva is put into the rotating tray 603, the current attitude of the larva is captured by the camera, and is processed by the host computer, subsequently the host computer controls the rotating tray 603 to rotate via the step motor 606 so as to bring the zebrafish larva into a target attitude. Then, a capture position is detected, the suction holding mechanical arm 3 (the mechanical arm 3 at which the suction holding needle 14 is arranged) drives the suction holding needle 14 to move into the vicinity of the zebrafish larva, then the suction pump 11 is started, and the holding force is controlled according to the deformation of the skin of the zebrafish larva such that the zebrafish larva is caught by suction and held. After the zebrafish larva is caught by suction, the suction holding mechanical arm 3 and the injection mechanical arm 3 (the mechanical arm 3 at which the injection needle 15 is arranged) simultaneously move to a switching point, then the host computer controls the microscope 2 to increase the magnification factor, the camera captures a current image of the zebrafish larva, the host computer judges whether the image is focused or not, and if not, the microscope 2 is controlled to rise and fall for focusing so that the zebrafish larva is refocused. Then, the camera captures an image of the injection needle 15, and the host computer carries out processing on the image and controls the mechanical arm 3 to move so as to perform active focusing on the injection needle 15; the camera captures an image of the zebrafish larva, an image processing software in the host computer can calculate the length of the skin of the zebrafish larva sucked into the suction holding needle 14 according to the image of the skin of the zebrafish larva shot by the camera 1, and the magnitude of a force on the skin of the zebrafish larva is obtained according to a relationship between the length and pressure intensity; the image processing software is written in VS20010 with MFC; different organs are detected to obtain their position information, then the injection needle 15 is moved to a corresponding position where, by means of image processing, the injection needle 15 is allowed to just contact the skin of the larva; the attitude of the zebrafish larva before injection and positions of the suction holding needle 14 and the injection needle 15 are shown in FIG. 4, and after the injection needle 15 contacts the skin, the injection needle 15 penetrates into an organ 16 to be injected, and the injection pump 4 is started, thereby completing the injection. Then, the suction holding pump 11 releases pressure to free the zebrafish larva from the suction holding needle 14, the suction holding mechanical arm 3 and the injection mechanical arm 3 are controlled to return to original points, and the lens of the microscope 2 recovers to initial magnification, waiting for the next round of injection.

Figure 6:
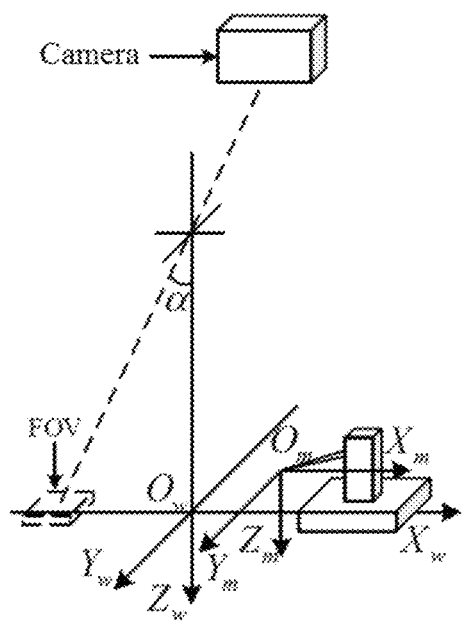
FIG. 6 is a first schematic diagram illustrating a pinhole model of a needle tip positioning method based on the pinhole model according to the present invention.
Figure 7:
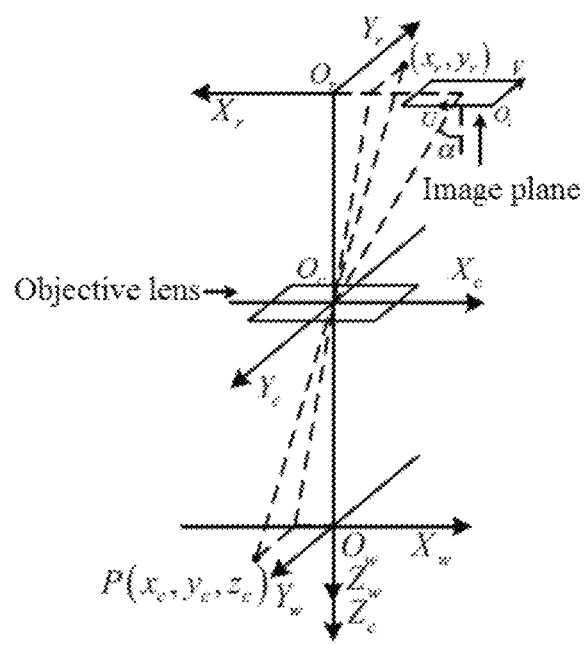
FIG. 7 is a second schematic diagram illustrating the pinhole model of the needle tip positioning method based on the pinhole model according to the present invention.

For slight changes of the height of water surface in the continuous operation process, as the stereomicroscope 2 has the characteristic of oblique line of sight, the accuracy of the position of the injection needle may be reduced due to the changes of the height of water surface. According to the present invention, on the basis that the whole imaging system is considered as a conventional pinhole model, the influence of water surface refraction is taken into account, the position coordinates fed back to the host computer by the mechanical arm 3 is subjected to coordinate transformation using a coordinate transformation matrix to obtain a pixel coordinate position, and a difference between the obtained pixel coordinate position and a coordinate position obtained from an image captured by the camera 1 fed back to the host computer is taken as a loss function, and all parameters in the pinhole model are calculated by using a gradient descent method. The coordinate transformation matrix may be automatically adjusted when the height of water surface changes, so that continuous high-precision operation can be performed on objects continuously putted into the tray. Referring to FIGS. 6 and 7, the specific operation process is as follows:

$O_i$-UV is a pixel coordinate system, in which $O_i$ represents an origin at an upper left corner of an image. $O_r$-$X_r Y_r$ is an image coordinate system, in which $O_r$ represents a point of intersection of an optical axis and an image plane. $O_m$-$X_m Y_m Z_m$ is the mechanical arm 3 coordinate system, in which $O_m$ represents the position of the needle tip when the coordinates of mechanical arm 3 are set to zero. $O_c$-$X_c Y_c Z_c$ is a camera 1 coordinate system, in which $O_c$ represents an optical center of the camera 1. $O_w$-$X_w Y_w Z_w$ is a world coordinate system, in which $\propto$ is an angle formed by the optical axis and the focal plane of the camera.

For the whole system, a relationship between the position coordinate system of the micromanipulation mechanical arm 3 fed back to the host computer by the mechanical arm 3 and the pixel coordinate system fed back to the host computer by the camera 1 is as follows:

$$\begin{bmatrix} u \\ v \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} x_m \\ y_m \\ z_m \\ 1 \end{bmatrix}$$

wherein, u, v are coordinates in the pixel coordinate system; and $x_m$, $y_m$, $z_m$ are coordinates in the mechanical arm 3 coordinate system. $\{m_{ij}\}$ are parameters of the coordinate transformation matrix, wherein the values of the respective elements are obtained as described in the following paragraphs. Pixel coordinates of the target object are acquired by the camera 1 and then transmitted to the host computer, and the self coordinates of the mechanical arm 3 are fed back to the host computer in real time.

The host computer operates the mechanical arms 3 to move, and the needle tips at ends of the mechanical arms 3 are moved to 27 points in a 3*3*3 grid set by a program in the field of view of the camera 1, and corresponding coordinates of the mechanical arm 3 and coordinates of the needle tip in the image captured by the camera 1 are recorded. The position coordinates fed back by the mechanical arm 3 are subjected to coordinate transformation using the coordinate transformation matrix to obtain a corresponding pixel coordinate position, and the difference between the pixel coordinate position and the coordinate position obtained from the image acquired by the camera 1 is taken as the loss function. All elements of the transformation matrix $$\begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix}$$

in the above equation can be obtained by using the gradient descent method (a published mathematical method), and each parameter in the pinhole model can be calculated accordingly.

When the height of water surface changes, changes of the position of the object below the water surface in the pixel coordinate system only include translation, but no magnification or reduction. Thus, in the above coordinate transformation matrix, only $m_{14}$ and $m_{24}$ are changed. By comparing the changes of pixel coordinates at the same position before and after the change of water surface, the change of the height of water surface can be calculated and in turn a new coordinate transformation matrix can be obtained, which can make the mechanical arm 3 move to a target pixel coordinate position more accurately.

The transformation matrix is updated along with the change of water surface, so that the operation precision is guaranteed. The specific implementation of operating the mechanical arm 3 to reach a designated position according to the coordinate transformation matrix is that the coordinates which the mechanical arm 3 should be set to in the system can be obtained by solving the following linear equations group with two variables according to the coordinates u and v of the target position in the image and a preset height $z_m$.

$$\begin{cases} m_{11}x_m + m_{12}y_m = u - m_{13}z_m - m_{14} \\ m_{21}x_m + m_{22}y_m = v - m_{23}z_m - m_{24} \end{cases}$$

For the change of the focal plane caused by the change of the water surface and the change of the field of view, an auto-focusing method based on an extremum searching algorithm is adopted.

Figure 8:
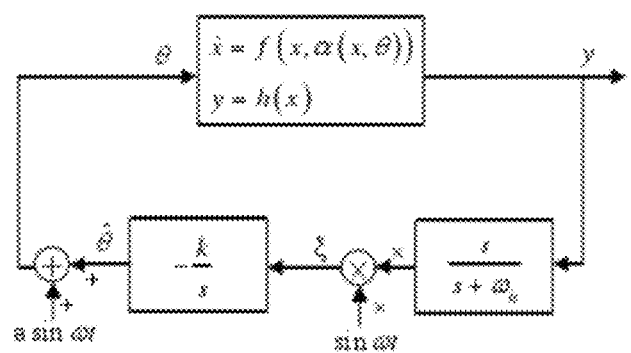
FIG. 8 is a diagram illustrating the principle of automatic focusing based on the extremum searching algorithm.

In an initial state, the microscope 2 is controlled by the host computer to firstly move to a preset height position θ, the position of the observed object is determined by the image acquired by the camera 1, and the definition y of the image of the observed object is calculated by applying a variance method to an ROI (region of interest) area of the target object (calculating the variance of gray values in the ROI area). After a new definition y is obtained, a new estimated position $\hat{\theta}$ is obtained according to an extremum searching algorithm, then, a next round of calculation is performed, and the position height θ of the microscope 2 is continuously adjusted until a target definition y is obtained. The specific process is shown in FIG. 8. FIG. 8 is a diagram illustrating the principle of automatic focusing based on the extremum searching algorithm, and the principle is as follows: wherein $\hat{\theta}$ is an estimated position of the microscope 2 and is added with an excitation signal α sin ωt to obtain a "tentative" position θ of the microscope 2; the host computer controls the microscope 2 to move to this position, then the definition y of the ROI area of the observed object is calculated; and the definition y is subjected to the combined action of high-pass filtering $$\frac{s}{s+\omega_h}$$

(the formula is its frequency domain representation, and $\omega_h$ is a corner frequency in the frequency domain; the specific calculation process is described below) and a demodulation signal sin ωt so that an approximate gradient ζ of the system is obtained; and finally, by an integration procedure $$-\frac{k}{s}$$

(the formula is its frequency domain representation, and k is an integration parameter; the specific calculation process is described below), a new estimated position $\hat{\theta}$ of the microscope 2 is obtained, and the host computer controls the microscope 2 to move to this position. The above calculation process is continuously iterated until a position at which ROI area is clearest is reached.

Wherein, high-pass filtering is used to remove interference, and adopts the following formula $$H_{i+1} = \frac{2y_{i+1} - 2y_i - (hT-2)H_i}{hT+2}$$

$y_{i+1}$ is the current definition, $y_i$ is the definition obtained at the last high-pass filtering, $H_{i-1}$ is the definition obtained through high-pass filtering, $H_i$ is the definition obtained through the last high-pass filtering, and T is the sampling interval time.

The integration procedure adopts bilinear transformation:

$$\hat{\theta}_{i+1} = \hat{\theta}_i + \frac{(\zeta_i + \zeta_{i+1})kT}{2}$$

Wherein $\hat{\theta}_{i+1}$ is an estimated height position of the microscope 2 obtained at the current integration procedure, $\hat{\theta}_i$ is an estimated height position of the microscope 2 obtained at the last integration procedure, and k is an integration parameter. In definition evaluation standards based on the variance method, the larger the variance, the better the definition. Accordingly, the relationship between definition and position can be partially approximated as a second-order differentiable continuous function with a graph of the function opening upwards, then the integration parameter k is determined by $f''$, when $f''>0$, k>0; when $f''<0$ k<0, and for this system, k<0.

In the description of the invention, it should be noted that the terms "top", "bottom", "inner", "outer", and the like for describing orientations or positional relationships are based on the orientations or positional relationships shown in the drawings, and are only for convenience in describing the invention and simplifying the description, but do not indicate or imply that the referenced device or element must have a particular orientation, be constructed and operated in a particular orientation. It is therefore not to be understood as limiting the invention. Furthermore, the terms "first" and "second" are used for descriptive purposes only and are not to be construed as indicating or implying relative importance.

In this specification, specific examples are set forth to illustrate the principles and embodiments of the invention, and the description of the embodiments is merely provided to assist in understanding the method of the invention and its core concepts; at the same time, changes will occur to those skilled in the art in light of the teachings of this invention in both the detailed description and the scope of application. In summary, the description should not be construed as limiting the invention.

What is claimed is:

1. An intelligent micromanipulation system based on machine vision, comprising: a base, wherein a microscope, a rotating table and two lifting tables are arranged on the base, the microscope is located right above the rotating table, the two lifting tables are arranged at two sides of the rotating table, respectively, and each is provided with a mechanical arm, each of the two mechanical arm is provided with an end effector, the mechanical arm is capable of driving the corresponding end effector to perform fine adjustment in x, y and z directions, one of the end effectors clamps a suction holding needle which is in communication with a suction pump, while the other end effector clamps an injection needle which is in communication with an injection pump; and the rotating table comprises a tray, a rotating mechanism and a driving device, and the driving device is capable of driving the tray to rotate via the rotating mechanism.

2. The intelligent micromanipulation system based on machine vision of claim 1, wherein, the rotating table further comprises a rotating support platform, and the driving device is a step motor and is mounted on a fixed seat fixedly arranged below the rotating support platform.

3. The intelligent micromanipulation system based on machine vision of claim 2, wherein, the rotating mechanism comprises a tray sleeve, a first belt wheel, a synchronous belt and a second belt wheel, the first belt wheel is fixedly disposed on an output shaft of the driving device, the synchronous belt is wound on the first belt wheel and the second belt wheel, the second belt wheel is fixedly connected to the tray sleeve, the tray sleeve is also axially engaged with the rotating support platform through a bearing, the rotating support platform is slidably arranged on the base through a rail fixing device, and the rotating tray is mounted on the tray sleeve; and the rail fixing device comprises two sliding rails arranged on the base, and the two sliding rails are arranged at two sides of the rotating support platform, respectively, and the two sliding rails are respectively slidingly engaged with ends of the rotating support platform.

4. The intelligent micromanipulation system based on machine vision of claim 3, wherein, the bearing is axially positioned in the rotating support platform through a bearing cover of the bearing, an outer ring of the bearing is in contact with the rotating support platform, an inner ring of the bearing is in contact with the tray sleeve, and the bearing is a deep groove ball bearing.

5. The intelligent micromanipulation system based on machine vision of claim 1, further comprising: a camera which is mounted above the microscope and right opposite to an ocular lens of the microscope, wherein the camera is in connection with a host computer.

6. The intelligent micromanipulation system based on machine vision of claim 5, further comprising: an LED light source which is mounted below the base and is located right below the rotating table.

7. The intelligent micromanipulation system based on machine vision of claim 6, wherein, the LED light source is covered with a brightness enhancement film.

8. The intelligent micromanipulation system based on machine vision of claim 1, wherein, the base is also provided with a needle tip positioning plate.

9. The intelligent micromanipulation system based on machine vision of claim 1, wherein, a needle tip of the injection needle can realize automatic positioning and can be adaptively adjusted according to a change of a height of a liquid surface to ensure accuracy of automatic operation.

10. The intelligent micromanipulation system based on machine vision of claim 1, wherein, the microscope can realize automatic focusing on an observation operation object according to information of an acquired image.

11. The intelligent micromanipulation system based on machine vision of claim 10, wherein, the height position of the microscope is continuously adjusted based on an extremum searching algorithm to achieve the automatic focusing.

12. A needle tip positioning method based on a pinhole model, which is applicable to an intelligent micromanipulation system based on machine vision of comprising:

a base, wherein a microscope, a rotating table and two lifting tables are arranged on the base, the microscope is located right above the rotating table, the two lifting tables are arranged at two sides of the rotating table, respectively, and each is provided with a mechanical arm, each of the two mechanical arm is provided with an end effector, the mechanical arm is capable of driving the corresponding end effector to perform fine adjustment in x, y and z directions, one of the end effectors clamps a suction holding needle which is in communication with a suction pump, while the other end effector clamps an injection needle which is in communication with an injection pump; and the rotating table comprises a tray, a rotating mechanism and a driving device, and the driving device is capable of driving the tray to rotate via the rotating mechanism;

wherein the method comprises:

firstly, acquiring position coordinates of mechanical arms, then, obtaining pixel position coordinates of the mechanical arms based on the position coordinates of the mechanical arms according to a preset coordinate transformation matrix, thereafter, calculating a transformation matrix between the pixel position coordinates of the mechanical arms and the pixel coordinates of an image acquired by a camera, and finally, obtaining intrinsic parameters of the transformation matrix between the position coordinates of the mechanical arm and the pixel coordinates of the image acquired by the camera, as well as intrinsic parameters of an imaging system; and when a next operation is performed, calculating a change of a height of a liquid surface according to a change of pixel coordinates of ends of the mechanical arms relative to pixel coordinates at the same position for a last operation, and then updating the coordinate transformation matrix.

13. The needle tip positioning method based on the pinhole model of claim 12, wherein, a difference between the pixel position coordinates of the mechanical arms and the pixel coordinates of the image is taken as a loss function, and intrinsic parameters of the transformation matrix between the pixel position coordinates of the mechanical arms and the pixel coordinates of the image as well as intrinsic parameters of the imaging system are calculated by using a gradient descent method.

14. The needle tip positioning method based on the pinhole model of claim 13, wherein, a relationship between the position coordinates of the mechanical arms and the pixel coordinates of the image is as follows:

$$\begin{bmatrix} u \\ v \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} x_m \\ y_m \\ z_m \\ 1 \end{bmatrix}$$

wherein, u, v are coordinates in an image pixel coordinate system; $x_m$, $y_m$, $z_m$ are coordinates in mechanical arms coordinate system; and $\{m_{ij}\}$ are parameters of the coordinate transformation matrix.

15. The needle tip positioning method based on the pinhole model of claim 12, wherein, the rotating table further comprises a rotating support platform, and the driving device is a step motor and is mounted on a fixed seat fixedly arranged below the rotating support platform.

16. The needle tip positioning method based on the pinhole model of claim 15, wherein, a difference between the pixel position coordinates of the mechanical arms and the pixel coordinates of the image is taken as a loss function, and intrinsic parameters of the transformation matrix between the pixel position coordinates of the mechanical arms and the pixel coordinates of the image as well as intrinsic parameters of the imaging system are calculated by using a gradient descent method.

17. The needle tip positioning method based on the pinhole model of claim 16, wherein, a relationship between the position coordinates of the mechanical arms and the pixel coordinates of the image is as follows:

$$\begin{bmatrix} u \\ v \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} x_m \\ y_m \\ z_m \\ 1 \end{bmatrix}$$

wherein, u, v are coordinates in an image pixel coordinate system; $x_m$, $y_m$, $z_m$ are coordinates in mechanical arms coordinate system; and $\{m_{ij}\}$ are parameters of the coordinate transformation matrix.

18. The needle tip positioning method based on the pinhole model of claim 15, wherein, the rotating mechanism comprises a tray sleeve, a first belt wheel, a synchronous belt and a second belt wheel, the first belt wheel is fixedly disposed on an output shaft of the driving device, the synchronous belt is wound on the first belt wheel and the second belt wheel, the second belt wheel is fixedly connected to the tray sleeve, the tray sleeve is also axially engaged with the rotating support platform through a bearing, the rotating support platform is slidably arranged on the base through a rail fixing device, and the rotating tray is mounted on the tray sleeve; and the rail fixing device comprises two sliding rails arranged on the base, and the two sliding rails are arranged at two sides of the rotating support platform, respectively, and the two sliding rails are respectively slidingly engaged with ends of the rotating support platform.

19. The needle tip positioning method based on the pinhole model of claim 18, wherein, a difference between the pixel position coordinates of the mechanical arms and the pixel coordinates of the image is taken as a loss function, and intrinsic parameters of the transformation matrix between the pixel position coordinates of the mechanical arms and the pixel coordinates of the image as well as intrinsic parameters of the imaging system are calculated by using a gradient descent method.

20. The needle tip positioning method based on the pinhole model of claim 19, wherein, a relationship between the position coordinates of the mechanical arms and the pixel coordinates of the image is as follows:

$$\begin{bmatrix} u \\ v \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} x_m \\ y_m \\ z_m \\ 1 \end{bmatrix}$$

wherein, u, v are coordinates in an image pixel coordinate system; $x_m$, $y_m$, $z_m$ are coordinates in mechanical arms coordinate system; and $\{m_{ij}\}$ are parameters of the coordinate transformation matrix.

* * * * *